United States Patent [19]
Maehara

[11] Patent Number: 4,811,054
[45] Date of Patent: Mar. 7, 1989

[54] COMPOSITE COPIER WITH TRIMMING AND MASKING MODES OF OPERATION

[75] Inventor: Shigeharu Maehara, Nara, Japan

[73] Assignee: Sharp Kabushiki Kaisha, Osaka, Japan

[21] Appl. No.: 78,557

[22] Filed: Jul. 28, 1987

[30] Foreign Application Priority Data

Jul. 31, 1986 [JP] Japan .............................. 61-1817484

[51] Int. Cl.[4] ...................... G03B 27/52; G03G 15/00
[52] U.S. Cl. ........................................... 355/40; 355/7
[58] Field of Search .................... 355/3 R, 14 R, 7, 40

[56] References Cited

U.S. PATENT DOCUMENTS

| | | | |
|---|---|---|---|
| 4,322,157 | 3/1982 | Miura et al. | 355/40 X |
| 4,371,898 | 2/1983 | Nakamura | 355/7 X |
| 4,472,050 | 9/1984 | Stockburger et al. | 355/40 |
| 4,694,354 | 9/1987 | Tanaka et al. | 355/40 X |
| 4,701,044 | 10/1987 | Horiuchi et al. | 355/7 |
| 4,711,557 | 12/1987 | Watanabe | 355/7 X |
| 4,714,940 | 12/1987 | Inoue et al. | 355/3 R |

*Primary Examiner*—Richard A. Wintercorn
*Attorney, Agent, or Firm*—Flehr, Hohbach, Test, Albritton & Herbert

[57] ABSTRACT

A composite copier has keys for selecting trimming and masking modes of operation whereby trimming and masking can be effected with respect to a specified area of an original image. The control system of the copier includes a memory device which remembers which of the modes has been selected and which area has been specified. After a copying process is effected on a copy sheet in the selected mode, the same sheet is recirculated back to the processing section for a second copying process with respect to the same area but from another original and in the other mode of operation.

5 Claims, 3 Drawing Sheets

COMPOSITE COPIER WITH TRIMMING AND MASKING MODES OF OPERATION

BACKGROUND OF THE INVENTION

This invention relates to a composite copier for combining two original images and forming their composite copy on a single copy sheet.

Among multi-functional copiers, there are those which can carry out trimming and masking. With a copier of this type, keys and the like provided on the control panel are operated to specify an area and the trimming mode of operation is used to copy only the image inside this specified area while the image outside is erased. The masking mode of operation is used to copy only the image outside a specified area. By using a copier thus structured, so-called composite copying can be effected whereby images from two original documents are combined to form a composite image on a single sheet of copy paper.

With a conventional copier, composite copying is effected by first selecting either the trimming or the masking mode of operation and then specifying an image area, the first copying process being carried out thereupon. Subsequently, the original document is replaced by another original, the other of the aforementioned two modes is selected, the image area is specified again, the copy sheet which has just been subjected to the first copying process is taken out of the discharge section and set in the paper supply section again and the second copying process is thereafter carried out. In summary, a complicated series of steps must be followed with a conventional composite copier to obtain a composite copy.

SUMMARY OF THE INVENTION

It is therefore an object of the present invention to provide a composite copier which can simplify the composite copying process by storing the mode of operation and an image area for the first copying process, changing the mode of operation for the second copying process with respect to the same image area and leading the once processed copy sheet into a recirculating route such that the second copying process can be carried out continuously and that the steps of setting a second mode of operation and feeding the copy paper again can be dispensed with.

A composite copier of the present invention which can achieve the above and other objects comprises area storage means for storing area data defining a specified area of an original image, mode selecting means for selecting between the trimming and masking modes of operation, mode storing means for storing the selected mode, paper recirculating means for recirculating a copy sheet after a first copying process back to the processing section for a second copying process, and mode switching means for activating the paper recirculating means for composite copying, activating the mode stored in the mode storing means with respect to the specified area for the first copying process and activating the other mode for the second copying process. With a copier thus structured, the image area of an original with respect to which trimming and masking are effected is stored in the area storing means, the selection between the trimming and masking modes of operation made by the mode selecting means is stored in the mode storing means, a once-processed copy sheet is sent back to the processing section by the paper recirculating means such that copying process can be carried out continuously for the second time, and the two copying processes on the same copy sheet are effected in different modes but with respect to the same area by the operation of the mode switching means.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
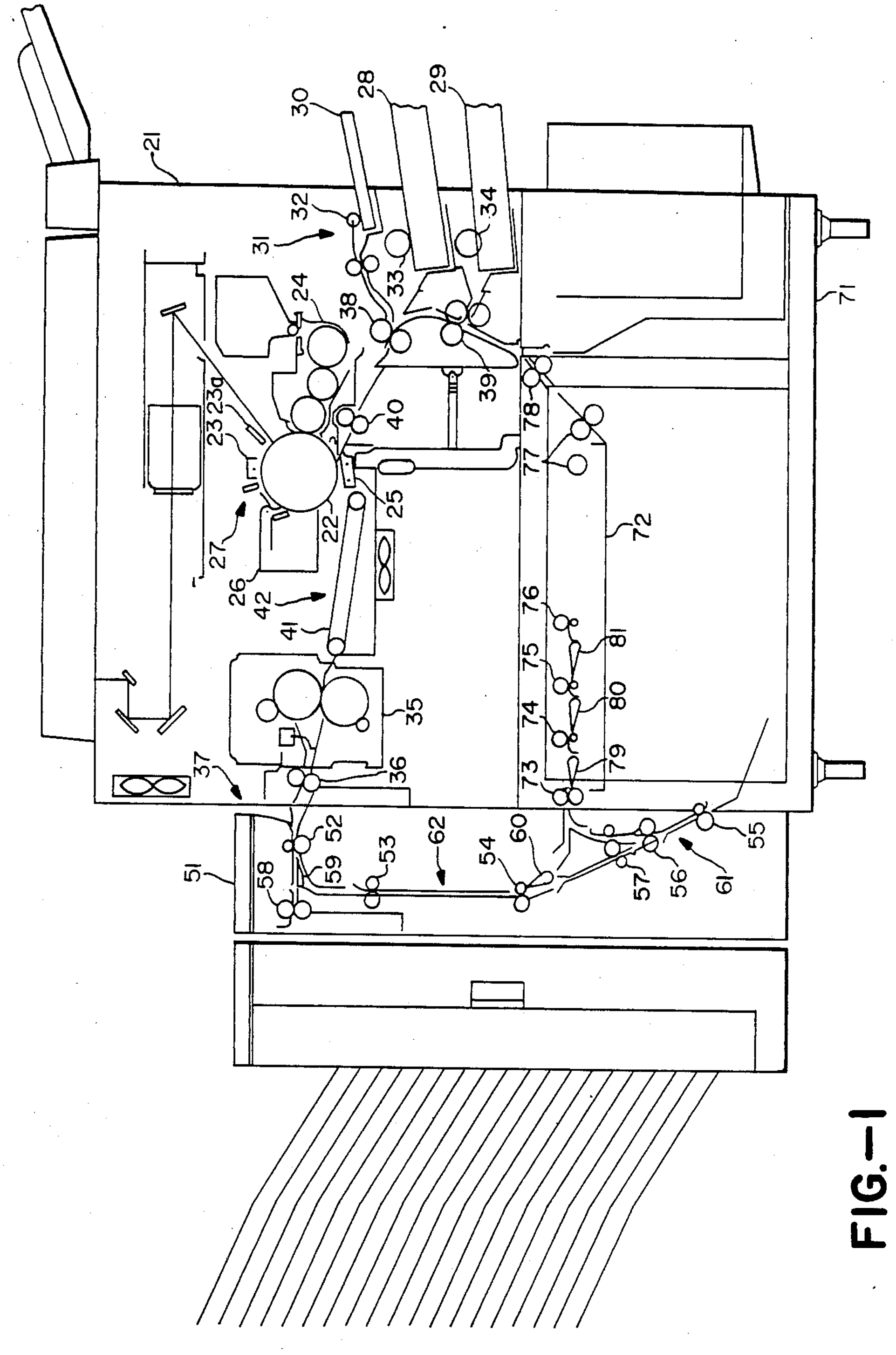
FIG. 1 is a schematic frontal sectional view of a composite copier embodying the present invention.

With reference to FIG. 1 which is a schematic frontal sectional view of a composite copier embodying the present invention, a photosensitive drum 22 is disposed at the center part inside the copier housing 21 and forms a processing section 27 together with a primary charger 23, a developing unit 24, an image transfer-paper removal charger 25 and a cleaning unit 26 along its outer periphery. The processing section 27 also includes a blanking lamp 23*a* for providing light to a portion of the surface of the photosensitive drum 22 other than the area where an image is formed such that latent images are erased and adsorption of developing agent is prevented from there. Paper cassettes 28 and 29 and a tray 30 for manual paper feed are provided on a side surface of the housing 21 and form a paper supply section 31. The paper supply section 31 also includes paper feed rollers 32–34 for delivering paper from either one of the cassettes 28 and 29 or the tray 30. A fixing unit 35 composed of a pair of rollers is inside the housing 21 near the other side surface. A copy paper sheet, after passing through this fixing unit 35, is discharged from a paper discharge section 37 by paper discharge rollers 36 to the exterior. Rollers 38–40 and a conveyer belt 41 are provided along a principal paper transportation route 42 defined between the paper supply section 31 and the paper discharge section 37 through the processing section 27.

A sorter 51 is attached to the side surface of the housing 21 opposite the paper discharge section 37. Inside the sorter 51 are conveyer rollers 52–54, switchback rollers 55–57 and discharge rollers 58. The switchback rollers 55–57 are rotatable in both (positive and negative) directions and form a switchback route 61. A flapper 59 is provided between the conveyer rollers 52 and the discharge rollers 58 and another flapper 60 is provided between the conveyer rollers 54 and the switchback rollers 57. Each of the flappers 59 and 60 can assume two positions such that an incoming copy sheet can be directed selectably in either of two directions. The upper flapper 59 serves to direct a copy sheet discharged from the paper discharge section 37 selectably either to the discharge rollers 58 or to a secondary paper transportation route 62. The lower flapper 60 serves to direct a copy sheet which has passed through the secondary route 62 selectably either to the switchback route 61 or into a cabinet 71.

Inside the cabinet 71 is an intermediate tray 82 provided with paper introducing rollers 73–76, paper transporting rollers 77 and 78 and flappers 79–81. The flappers 79–81 are movably supported and the one of those corresponding to the size of the paper to be dropped into the intermediate tray 72 is moved up from the position shown in FIG. 1. The paper introducing rollers 73–76, the intermediate tray 72 and the paper transporting rollers 77 and 78 serve to extend the secondary route 62 to the paper supply section 31, thereby connecting the paper discharge section 37 with the paper supply section 31.

In summary, the principal paper transportation route 42 is formed inside the housing 21 and the secondary route 62 is formed inside the sorter 51 and the cabinet 71. In the ordinary one-side copying process, each copy sheet delivered from the paper supply section 31 is passed through the principal route 42 and discharged from the discharge section 37 by the discharge rollers 58.

In the case of a composite copying process whereby images from a plurality of original documents are formed on a single sheet of copy paper, the copy sheet which has passed through the processing section 27 is directly led into the intermediate tray 72 through the secondary route 62. After the original is replaced, the copy sheet stored in the intermediate tray 72 is passed between the paper supply section 31 and the processing section 27 by the rollers 77 and 78 and delivered to the processing section 27 by the rollers 38 and 40. After thus passing through the processing section 27 a desired plural number of times, the copy sheet is discharged from the paper discharge section 37 by the discharge rollers 58. The flappers 59 and 60, the intermediate tray 72 and the paper transporting rollers 77 and 78 form what may hereinafter be referred to as the paper recirculating means.

Figure 2:
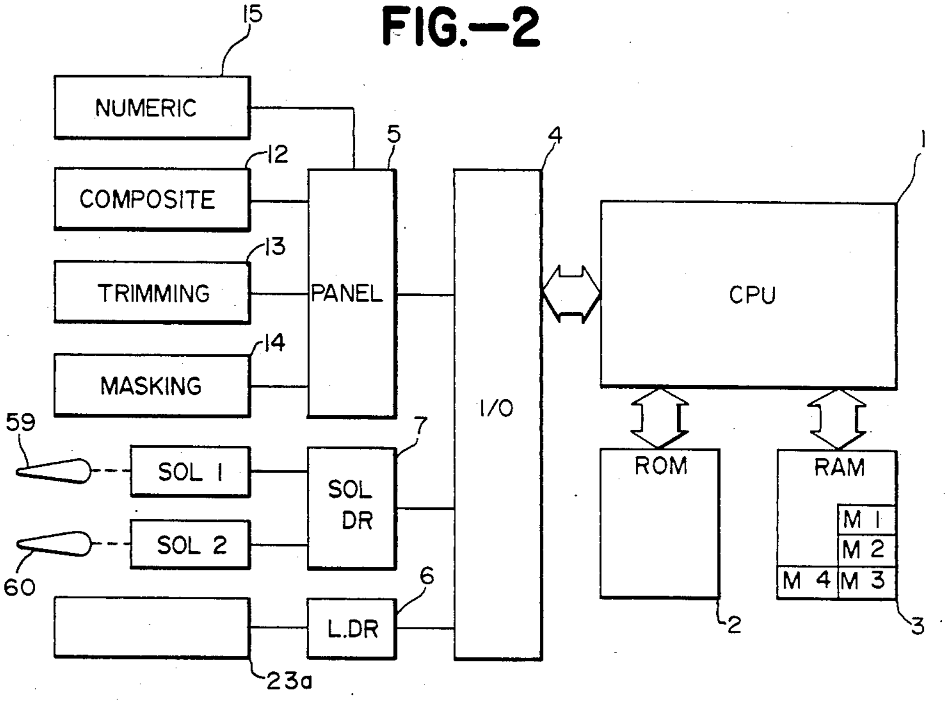
FIG. 2 is a block diagram of the control section of the copier of FIG. 1.

With reference next to FIG. 2 which is a block diagram of the control section (not shown in FIG. 1) of the composite copier described above, a control panel 5 is provided with a composite copying key 12, a trimming key 13 and a masking key 14, and when any of these keys is operated, a corresponding signal is transmitted from the panel 5 through an I/O interface 4 to be received by a central processing unit CPU 1. The composite copying key 12 is operated when it is desired to copy images from two original documents onto a single sheet of copy paper. The trimming key 13 is for transmitting a signal to switch on the blanking lamp 23*a* such that images outside a predefined area will not be copied. The masking key 14 is for transmitting another signal to switch on the blanking lamp 23*a* such that images inside a predetermined area will not be copier. Numeric keys 15 are used for predefining such an area.

Data on the position of the area predefined by operating the numeric keys 15 or the like are stored in a preassigned memory area M4 of a random-access memory RAM 3. A read-only memory ROM 2 is connected to the CPU 1 and stores programs for the various constituent units of the copier. The CPU 1 transmits control data according to such programs to a solenoid driver 7, a blanking lamp driver 6, etc. through the I/O interface 4. The solenoid driver 7 is adapted to control the motion of the flappers 59 and 60 by solenoids SOL1 and SOL2. The blanking lamp driver 6 controls the blanking lamp 23*a* depending on whether trimming or masking mode of operation has been selected and what area has been predefined. The aforementioned memory area M4 represents what is referred to as area storing means in the claims and the trimming and masking keys 13 and 14 as mode selection means.

Figure 3:
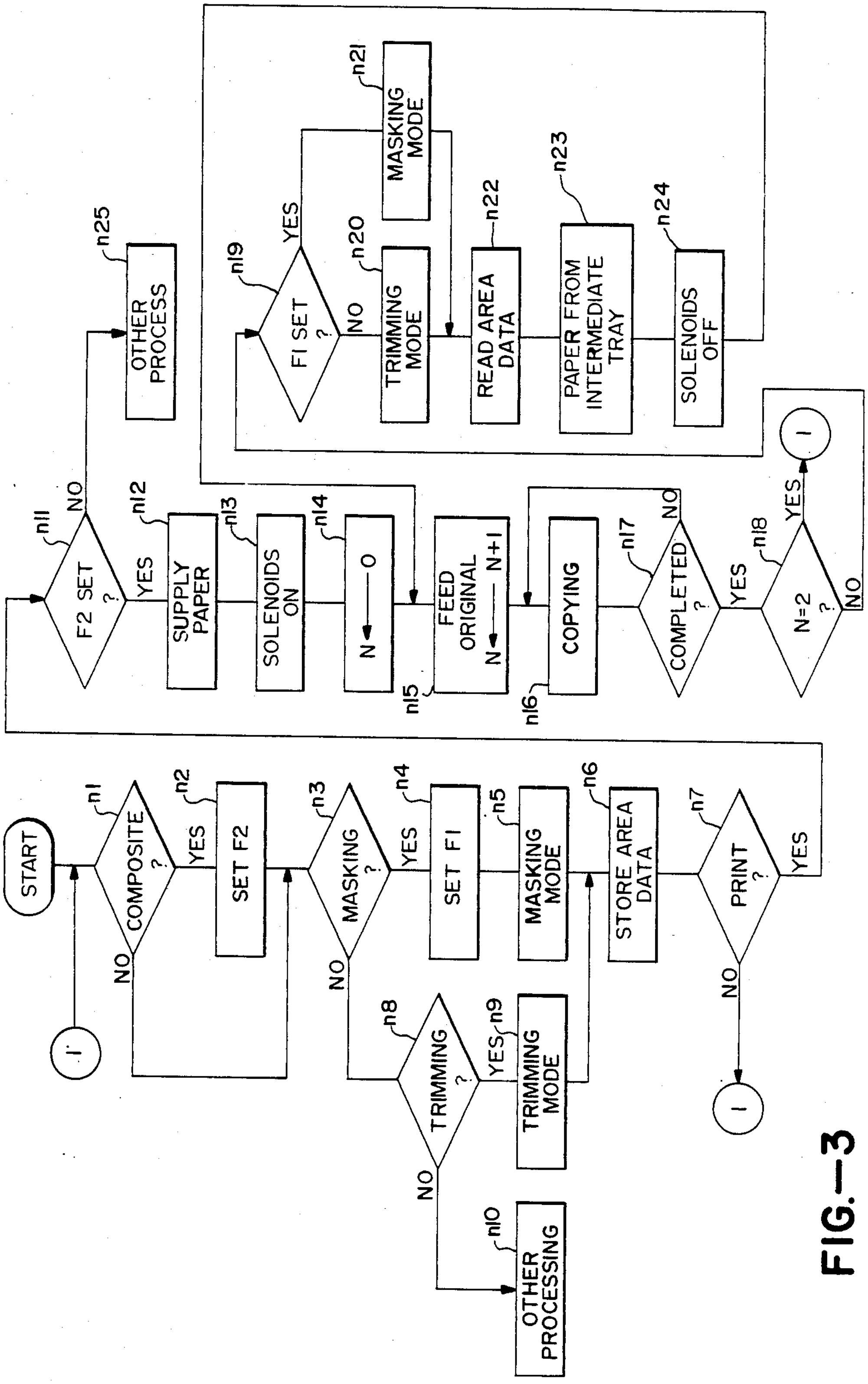
FIG. 3 is a flow chart of the operation of the copier according to the present invention and described in FIGS. 1 and 2, and FIGS. 4(A), (B) and (C) are plan views of images for explaining the composite copying process by the copier of FIGS. 1 and 2 according to the process explained by way of FIG. 3.

FIG. 3 is a flow chart showing the operations of the composite copier described above. When the composite copying key 12 is operated (n1), a flag F2 is set in memory area M2 of the RAM 3 (n2). This flag F2 is for indicating whether the composite copying mode of operation has been selected or not, being set if this mode of operation is selected. Next, it is checked whether the masking key 14 has been operated (n3) and, if it is found to have been operated, another flag F1 is set in memory area M2 of the RAM 3 (n4) and the processing in the masking mode is carried out (n5). This flag F1 is for indicating which of the two modes, trimming or masking, has been selected, being set if the masking mode is selected. In Step n5, the blanking lamp 23*a* is so controlled that the area to be later defined will be exposed to light for a predetermined period of time.

If it is determined that the masking key 14 has not been operated (NO in n3), it is checked whether the trimming key 13 has been operated (n8). If the trimming key is found to have been operated, the processing in the trimming mode is carried out (n9) with the blanking lamp 23*a* so controlled that areas other than the area to be later defined will be exposed to light for a predetermined period of time. If neither the masking key 14 nor the trimming key 13 has been operated, some other processing is carried out (n10).

When the numeric keys 15 are operated by the operator to enter area data, such data are stored in memory area M4 of the RAM 3 (n6). Thereafter, the system waits for the print switch (not shown) to be operated and the copying process is started when it is detected that the print switch has been operated (YES in n7). First, the flag F2 is checked (n11) to determine whether the composite copying mode has been selected. If the composite copying mode is found to have been selected, not only is a copy paper transported in from the paper supply section 31 (n12) but the solenoids SOL1 and SOL2 are switched on (n13) and a counter N is cleared (n14), N denoting also the content of this counter. The counter N is at memory area M1 of the RAM 3 and serves to count the number of copy sheets on which images are transferred in the case of a composite copying mode of operation. The paper route now opens from the paper discharge section 37 to the secondary route 62 and further into the intermediate tray 72 because the solenoids SOL1 and SOL2 are switched on such that processed copy sheets will become stored in the intermediate tray 72.

Next, an original document for copying is supplied and the content of the counter is increased by 1 (n15). Thereafter, the copying process is repeated for a set number of sheets (n16 and n17) and the copy sheets onto which copying has been effected are temporarily stored in the intermediate tray 72.

After the set number of sheets are thus processed, the content of the counter N is checked (n18). If N has not reached 2, the condition of the flag F1 (or the content of the memory area M2) is checked (n19). If the flag F1 is in the set condition, operations of the trimming mode are carried out (n20) and if the flag F1 is in the reset condition, operations of the masking mode are carried out (n21). Next, the area data stored in the memory area M4 are retrieved (n22), a copy sheet is transported out of the intermediate tray 72 (n23), the solenoids SOL1 and SOL2 are switched off (n24) and the next original is placed to be copied (n15). From this time on, copy sheets are sequentially supplied from the intermediate tray 72 and the processed copy sheets are discharged to the exterior since the solenoid SOL1 is in the OFF condition. The counter N is checked again (n18) after the processing described above is completed for the set number of times (n17) and, if N is found to have reached 2, the system is ready for the beginning of the next copying job.

If the flag F2 is found to be in the reset condition (NO in n11) after the print switch is operated (n7), some other processing is carried out (n25).

Figures 4A, 4B, 4C:
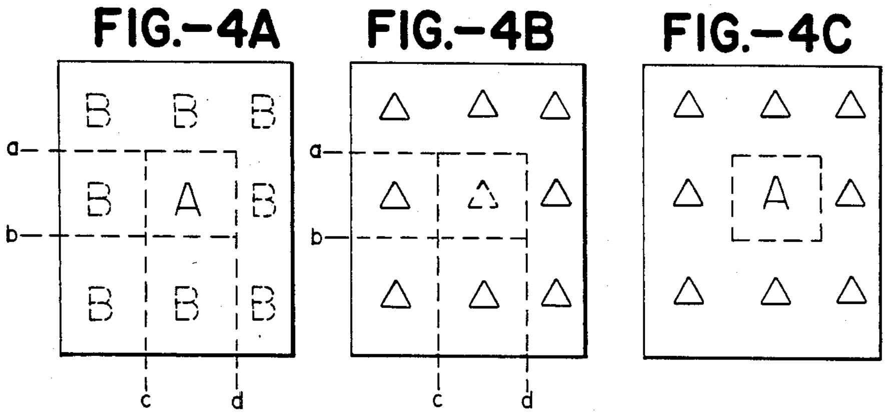

In the above explanation by way of FIG. 3, Steps n3–n5, n8, n9, n13, n19–n21 and n24 are operations by the mode selection means of the present invention. If the masking mode is selected, the first original is processed in the masking mode and the second original is processed in the trimming mode. If the trimming mode is selected, on the other hand, the first original is processed in the trimming mode and the second original is processed in the masking mode. Consider an example wherein originals shown in FIGS. 4(A) and (B) are used to obtain a composite shown by FIG. 4(C). In this situation, the area at the center in FIG. 4(A) is specified in terms of the coordinates of positions a, b, c and d and the trimming key 13 is operated. This causes only the image inside the designated area of the first original shown in FIG. 4(A) to be formed on a copy sheet. Thereafter, the second original shown in FIG. 4(B) is processed in the masking mode such that only the image outside the designated area is formed on the same copy sheet. As a result, an image shown in FIG. 4(C) can be obtained, as desired.

In summary, the choice between the trimming and masking modes for the first original is stored in a mode storing means and data for specifying the position of the selected area are stored in the area storing means. When a composite copy is desired, paper recirculating means are used to lead each sheet of copy paper back to the processing section for the second time such that a copying process is carried out first in the mode stored in the mode storing means with respect to the area specified by the data stored in the area storing means. With respect to the second original, the copying process is carried out in the other mode such that masking and trimming modes of operation are carried out with respect to the same area of the two originals and images from them can be formed on a single copy sheet. The operator is required to select a mode and define an area only once and after the copying operation is started, there is not need to manually move the copy sheets. In short, composite copying can be effected easily by a copier of the present invention.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. A composite copier adapted for trimming and masking modes of operation wherein trimming and masking are carried out with respect to a specified area of an original image, said copier comprising area storing means for storing area data defining a specified area of an original image, mode selecting means for selecting between a trimming mode and a masking mode of operation, mode storing means for storing said selected mode, paper recirculating means for recirculating a copy sheet after a first copying process thereon back to a processing section for a second copying process thereon, and mode switching means for activating said paper recirculating means for composite copying, activating the mode stored in said mode storing means with respect to said specified area for said first copying process and activating the other of said modes for said second copying process.

2. The composite copier of claim 1 further comprising a RAM, said area storing means and said mode select storing means being separate memory areas in said RAM.

3. The composite copier of claim 1 wherein said mode switching means is a central processing unit.

4. The composite copier of claim 1 wherein said mode selecting means include a trimming key for selecting said trimming mode and a masking key for selecting said masking mode.

5. The composite copier of claim 1 wherein said paper recirculating means include a flapper means selectively leading a processed copy sheet to be discharged or to an intermediate tray to be temporarily stored therein.

* * * * *